Figure 1:
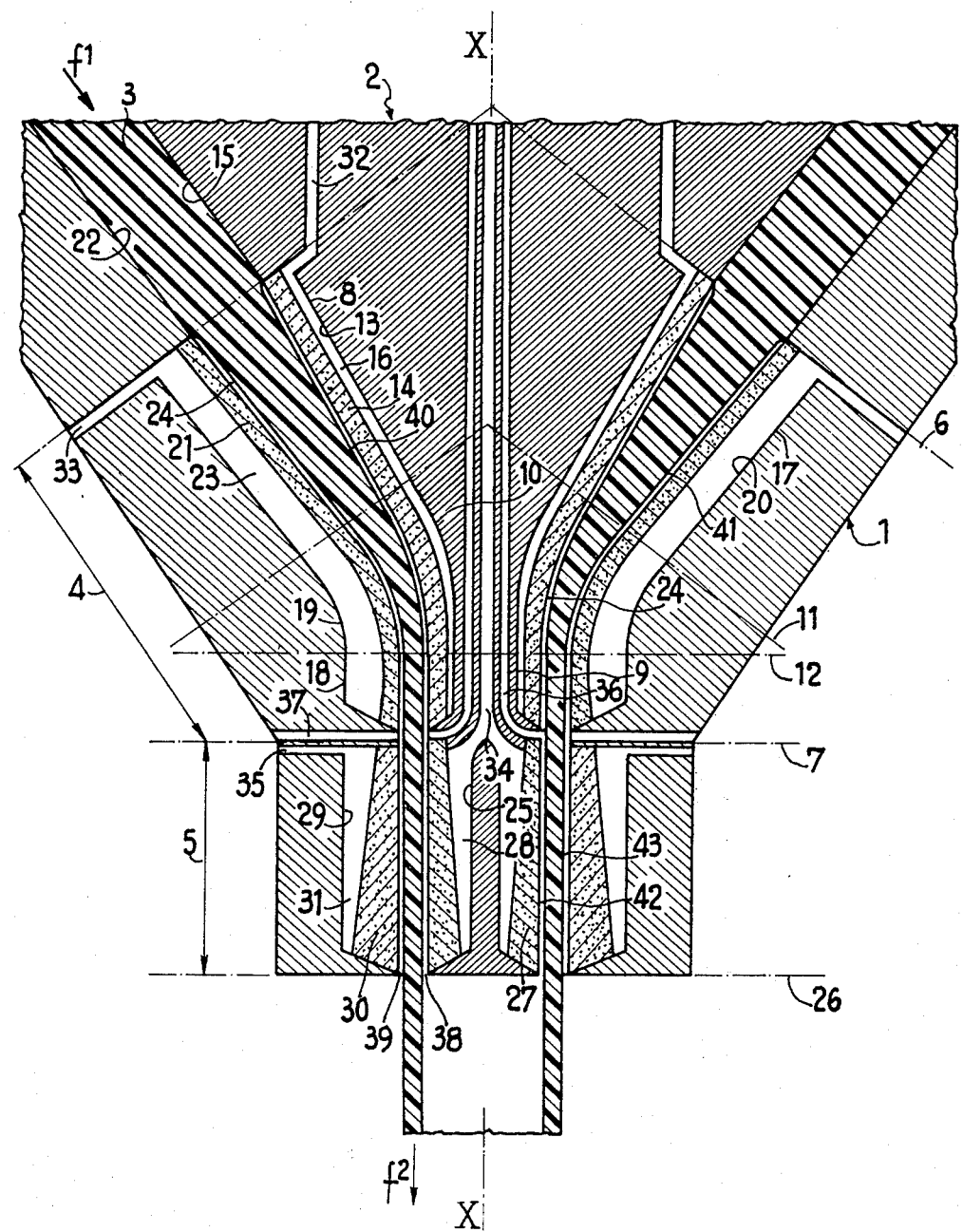

United States Patent [19]
Delorme et al.

[11] 3,907,484
[45] Sept. 23, 1975

[54] DIE HEAD FOR AN EXTRUDER

[75] Inventors: Pierre Claude Marcel Delorme; Yves Fournier, both of Chalon-sur-Saone, France

[73] Assignee: Pont-A-Mousson S.A., Nancy, France

[22] Filed: Nov. 27, 1972

[21] Appl. No.: 309,849

[30] Foreign Application Priority Data
Nov. 29, 1971 France .............................. 71.42631

[52] U.S. Cl. .................................. 425/467; 425/380
[51] Int. Cl.² .......................................... B29F 3/04
[58] Field of Search .......... 425/380, 437, 461, 467, 425/DIG. 20, DIG. 119, 466; 164/73, 268

[56] References Cited
UNITED STATES PATENTS

| | | | |
|---|---|---|---|
| 2,747,244 | 5/1956 | Goss | 164/268 X |
| 2,987,767 | 6/1961 | Berry et al. | 425/DIG. 119 |
| 3,342,252 | 9/1967 | Wood et al. | 164/73 X |
| 3,382,535 | 5/1968 | Ferrari | 425/461 |
| 3,710,241 | 1/1973 | Dineen | 324/54 |

Primary Examiner—Robert D. Baldwin
Assistant Examiner—Mark Rosenbaum
Attorney, Agent, or Firm—Sughrue, Rothwell, Mion, Zinn & Macpeak

[57] ABSTRACT

Extruder die head of the type having means for introducing a gaseous fluid through a wall defining the passage through which the extruded material flows. At least a part of this wall is of a material pervious to the gaseous fluid and is connected to a source of gaseous fluid under pressure on the side of this wall part opposed to the side thereof defining the passage.

1 Claim, 2 Drawing Figures

DIE HEAD FOR AN EXTRUDER

The present invention relates to a die head for an extruder.

It is well known that in the extruding of materials in a viscous or visco-elastic phase for obtaining a solid shaped section member of given size, one of the difficulties encountered resides in the fact that the flow of the material has a radial gradient in the rates of flow. Consequently, there is danger of adhesion to the walls, pressure drops requiring higher energies than theoretically necessary for a given flow or output without mentioning the risk of loss of cohesion of the mass in the course of extrusion if the limiting shear stress of the material is exceeded under the conditions of extrusion.

Certain remedies exist which include introducing internal or external lubricants and machining the metal walls in contact with the extruded material and, possibly, effecting a surface treatment of these walls.

Moreover, research and developments have been carried out to constitute between the extruded materials and the walls a fluid cushion which performs the function of a lubricant in association, possibly, with a cooling function.

For this purpose, producing a flow of air on the outer surface of the extruded product as it is being formed has been proposed, the air being introduced through the outer wall of the die head. In this case, however, there appear with increase in the rate of extrusion permitted by this arrangement flaws in the surface of the extruded material, this surface becoming, for example, mat and rough.

In order to avoid these defects, a cylinder-and-screw extruding apparatus has been proposed which comprises in the cylinder proper, that is to say upstream of the die head, a short-cylindrical collar which is perforated or porous for the entrance of air and the creation of a supporting, calibrating and/or cooling cushion of air. In fact, such an apparatus does not permit the creation of a satisfactory air cushion and is even liable to introduce gaseous inclusions in the extruded material if the latter is too fluid owing to a diffusion in the mass of plastics of the air introduced for producing the cushion.

An object of the invention is to remedy both the aforementioned drawbacks.

The invention provides a die head for an extruder of the type comprising means for introducing a gaseous fluid through the wall of a passage through which the extruded material passes, wherein at least a part of said wall is of a material pervious to the gaseous fluid to be introduced and is connected to a source of fluid under pressure on a side of said wall opposed to said passage.

Further features and advantages of the invention will be apparent from the ensuing description with reference to the accompanying drawings.

Figure 2:
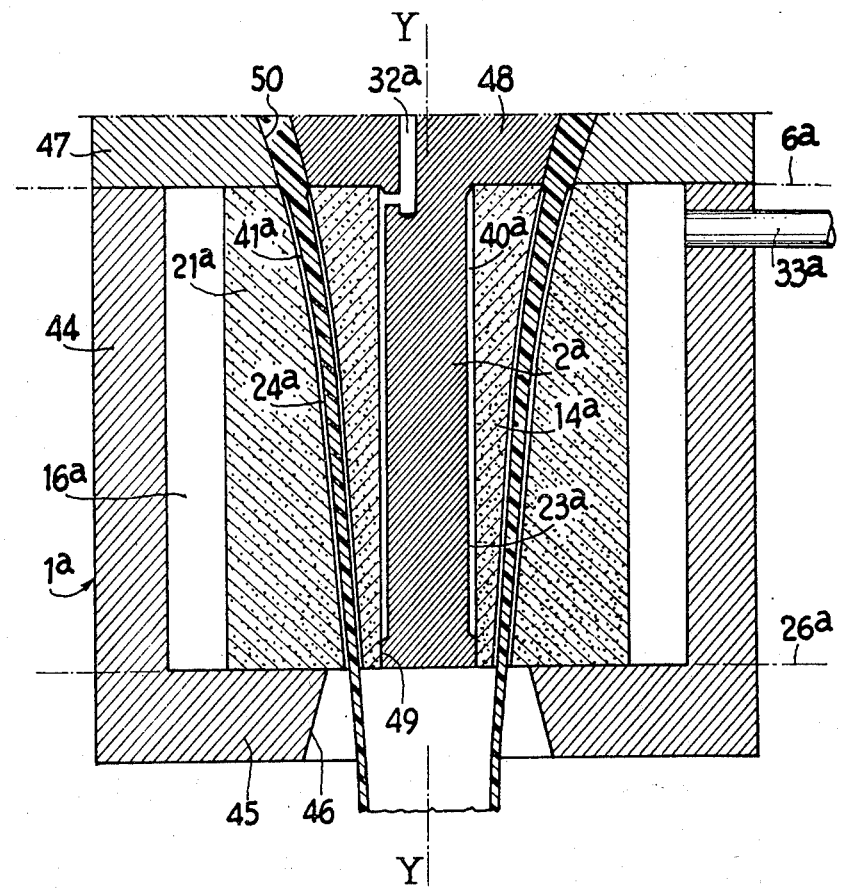

In the drawings:

FIG. 1 is an axial sectional view of a die head according to a first embodiment according to the invention, and FIG. 2 is a view similar to FIG. 1 of a second embodiment of a die head according to the invention.

The die head shown in FIG. 1 comprises a die head body 1 and a mandrel or punch 2 between which a viscous or visco-elastic material 3 flows in the direction of arrows $f^1$ and $f^2$ under the effect of a pressure exerted upstream of the die head by drive means of the extruder to which the die head must be secured or with which the die head is in one piece, said drive means being for example of the type including a screw or piston.

The terms upstream and downstream employed in the present description refer to the direction of flow of the material in the course of extrusion.

The two parts, namely the die head body 1 and the mandrel 2, are metal parts of revolution about a common axis X—X. The assembly comprises along the axis X—X and following on the drive means of the extruder (not shown), a first region 4 termed the shaping region and a second region 5 termed the solidification region in which the formed profile or section member is no longer, or only very slightly, modified but in which the material passes from the viscous or visco-elastic state to the solid state.

In the region 4, that is to say between a conical geometric surface 6 and a plane geometric surface 7 perpendicular to the direction of flux or flow of the material 3, the mandrel 2 comprises on the axis X—X a frustoconical upstream portion 8 and a cylindrical downstream portion 9 interconnected by a portion 10 having a curvature which is substantially hyperbolic between a conical geometric surface 11 and a plane geometric surface 12 perpendicular to the direction of flow of the material 3. In the mandrel and between the surfaces 6 and 7 there is provided on the surface an annular cavity 13 which has a constant depth and is closed adjacent the downstream end and on which is disposed a separate annular wall 14 which is so designed as to be flush with the general surface 15 of the mandrel and has a constant thickness which is less than the depth of the cavity 13 so as to define an annular chamber 16 in the latter. This wall 14 is of porous material, for example of sintered metal having a polished surface.

In the region 4, the die head body 1 has an opening of revolution which is adapted to receive the mandrel 2 and defines with the mandrel the annular passage desired for the material 3. This opening has a frustoconical upstream portion 17 and a cylindrical downstream portion 18 which are interconnected by a portion 19 having a substantially hyperbolic curvature between the surfaces 11 and 12. a polished the die head body between the surfaces 6 and 7 there is formed in the surface of the central opening an annular cavity 20 which has a constant depth and is closed at the downstream end and in which is disposed a separate annular wall 21 which is so shaped as to be flush with the general surface 22 of the die head body and has a constant thickness which is less than the depth of the cavity 20 so as to define an annular chamber 23 with the latter. The wall 21 is also of sintered metal having apolished surface.

Between the mandrel 2 and the die head body 1, the annular space 24 for the extrusion and flow of the material 3 between the sintered metal wall 14 and the sintered metal wall 21 has, in the direction from the upstream end to the downstream end, a section which decreases progressively in a regular manner from the surface 6 to the surface 12 where the mandrel and the opening of the die head body become cylindrical. Downstream of the surface 12, the annular space 24 for the flow of the material has a constant section.

In the region 5, the opening of the die head body and the mandrel are both cylindrical in the exact extension of the cylindrical portions 9 and 18 of the region 4. In the same way as in this region 4, the mandrel 2 has an annular cavity 25 which has a constant depth and is closed at its downstream end before the plane outlet surface 26 of the die head and contains a porous annular wall 27 of sintered metal having a polished surface, this wall defining an annular chamber 28 with the cavity. Further, in the same way as in the region 4, the die head body 1 comprises an annular cavity 29 which has a constant depth and is closed at its downstream end and contains a porous annular wall 30 of sintered metal having a polished surface, this wall defining an annular chamber 31 with the cavity.

The porous walls 27 and 30 have a thickness which increases progressively in a regular manner in the direction of the outlet surface 26 from the value of the constant thickness of the walls 14 and 21 so that their inner surface is frustoconical inside the chambers 28 and 31. Consequently, the chamber 31, which, in the region 5, follows on the chamber 23 of the region 4, has a section which decreases from the constant section that the chamber 23 had in the region 4 to a value which is practically zero at the downstream end of the region 5. Likewise, the chamber 28 which, in the region 5, follows on the chamber 16 of the region 4, has a section which decreases from the constant section that the chamber 16 had in the region 4 to an almost zero value. Further, the depth of the cavities 25 and 29 and the thickness of the walls 27 and 30 are such that the two annular chambers 28 and 31 have axial sections which are equal and symmetrical with respect to the trace of the median cylinder of the flow of material 3.

The cylindrical surfaces of the walls 27 and 30 which define the passage of material are flush at their downstream end with the outlet surface 26 of the die head.

The annular chambers 16, 23, 28 and 31 communicate with suitable means supplying fluid, for example air, by way of passages 32, 33, 34 and 35 which may optionally include heating or cooling means for the fluid supplied. Exhaust passages 36 and 37 are also provided respectively in the mandrel and die head body to put the exterior in communication with the annular space 24 provided for the flow of the material in the region 4. The annular space 24 also communicates by way of annular orifices 38 and 39 on the outlet surface 26 with the exterior on each side of the extruded material 3. The two passages 36 and 37 include means for regulating the pressure before exhaust of the fluid. The passages 35 and 37 are disposed radially in the region of the plane surface 7 and the passages 33 are disposed in axial planes on the conical surface 6, these passages opening onto the outer surface of the die head body 1. The passages 32, 34 and 36 are disposed axially and connect an inlet and an exhaust (not shown) respectively to the upstream end of the chamber 16 at the upstream end of the chamber 28, and to the projecting part of the mandrel which separates the walls 14 and 27.

The annular space 24 for the flow of the plastics material 3 is separated from the annular chambers 16, 23, 28 and 31 by the porous walls of sintered metal 14, 21, 27 and 30 and it is capable of receiving fluid under pressure throughout its length, through these walls and along the latter, from the passages 32-35.

The die head just described operates in the following manner:

In the region 4 a first stream of gas, for example air, is injected by way of the passages 32 and 33 at sufficient pressure to diffuse through the porous walls 14 and 21 and enter the annular space 24 for the material 3. Owing to the deformation of the plastics material extruded in the space 24 which has the decreasing section between the surfaces 6 and 12, a pressure of gas which is sufficient, but constantly decreasing in the direction of the flow of the plastics material, must be ensured throughout the length of the porous walls 14 and 21 so as to create continuous gas cushions 40 and 41. The substantially hyperbolic profile of the walls 14 and 21 ensures this condition for the continuity of the air cushions and corresponds to a gradient of gaseous pressure which is constant and negative.

In the region 5, a second stream of gas, for example air, is injected by way of the passages 34 and 35 also at a pressure sufficient to diffuse through the porous walls 27 and 30 into the annular space for the material 3. As the plastics material is no longer deformed in the part of the region 4 between the surfaces 12 and 7 and in the region 5 where the section of the space 24 remains constant, a fluid pressure which is lower than in the remainder of the region 4 is sufficient. This is essential for extruding a rigid tube. It is optional for extruding a tubular parison to be expanded by blowing.

As soon as this gaseous flow is achieved, and only at this moment, a flow of viscous or visco-elastic material is created in the extruder at a suitable rate for producing, at the outlet of the die head at the same massic rate of flow, a shaped section member in the solid state or in the state of a blank for subsequent treatment.

After having passed through the part of the extruder located upstream of the die head, the stream of material arrives in the region 4 in contact with the walls 14 and 21 of sintered metal having a polished surface. There are then formed between the viscous or visco-elastic material which flows through the extruder and the walls 14 and 21, gas cushions 40 and 41 to which gas is supplied by way of the passages 32 and 33.

Likewise, in the region 5, the passages 34 and 35 supply gas to the gas cushions 42 and 43 through the walls 27 and 30 of sintered metal having a polished surface, the cushions being formed between the solidified plastics material and the walls 27 and 30.

The association of the particular profile of the annular space 24 for the plastics material with the gas cushions 40-43 on the walls of the space 24 has the following results:

maximum possible flow of the plastics material for a given energy available at the inlet of the die head, since there is no loss by friction on the walls of the annular space 24;

avoidance of stagnation of the material, since there is no contact with the walls of the space 24, this ensuring a very even form of revolution in the extrusion and avoiding risks of local decomposition;

all the particles of the viscous or visco-elastic material are subjected to a both mechanical and thermal overall transformation which is practically uniform irrespective of the considered transverse region of the plastics material.

The nature, the temperature, the pressure and the flow of the gas employed for producing the cushions 40-43 must be appropriate for each case. Likewise, the regions 4 and 5 may be suitably subdivided, for example into a plurality of secondary regions supplied by separate chambers.

The substantially hyperbolic profile of the porous walls 14 and 21 in their curved portion between the surfaces 11 and 12 affords the advantage of avoiding a subdivision of the region 4 into a plurality of sectors of gaseous fluid supply to maintain the gas cushions 40 and 41. These hyperbolic profiles therefore permit maintaining suitable gas cushions by a construction which is as simple as possible without multiplying the supply and exhaust passages for the gaseous fluid.

In a general manner, the profiles of the porous walls depend on the pressure gradient of the gaseous fluid which must serve as a gas cushion for the extruded material. This gradient must always be negative in the direction of the flow of the extruded material. In the embodiment shown in FIG. 1 described hereinbefore, it is constant and achieved by a simple form, namely the double convergent frustoconical shape which becomes a hyperbolic convergent shape.

In the region 5, the cooling function of the air cushions 42 and 43 is of course added to the supporting and calibrating function they perform together with the cushions 40 and 41 of the region 4. Optionally, in one and/or the other of the two regions 4 and 5, the gas introduced may be made to have a chemical function provided that it is appropriate to the required chemical transformation which will thus be achieved in a continuous manner.

The gas under pressure must be supplied through the walls 14, 21, 27 and 30 before the arrival of the stream of viscous material in the annular space 24, otherwise this material would adhere to the walls and create a clogging of the surface pores of the material. Likewise, when the flow of plastics material has stopped for some reason, it is essential to maintain the gas cushions so as to avoid any adhesion.

By way of a modification of the operation of the die head, the mandrel 2 and the die head body 1 being parts of revolution having a common axis X—X, a movement of relative rotation about this axis between the mandrel 2 and the die head body 1 may be maintained without rupture of the cushions. This constitutes a very advantageous means for regulating the profiles produced by a rotary calibration.

The rotary mandrel 2 also permits extruding a continuous tubular object on its periphery without break or consecutive weld along a generatrix which is necessary in respect of a mandrel fixed to the die head by a crosspiece.

The mandrel 2 is of course discarded when it is desired to produce a solid profile member or a rod. In this case, only the gas cushions 41 and 43 are created against the sintered metal walls 21 and 30, the walls 14 and 27 being eliminated with the mandrel 2.

Instead of being composed of sintered metal the porous walls 14, 21, 27 and 30 may be of porous porcelain or china.

The die head shown in FIG. 2 comprises a body $1^a$ including a cylindrical wall 44 having a constant thickness and an end wall 45 provided with a centre opening 46. The body $1^a$ is cup-shaped and fixed under the body 47 of the extruder. The mandrel 48 extends in the form of a cylindrical nose portion $2^a$ which is centered on the axis of revolution Y-Y of the body $1^a$ and extends down to the bottom wall 45.

Disposed and fixed inside the body $1^a$ and around the nose portion of the mandrel $2^a$ are two masses of porous material $21^a$ and $14^a$ which have an annular shape and define therebetween an annular space for the flow of the plastics material $24^a$. They extend entirely between the level $6^a$ of the connection of the die head to the extruder and the level $26^a$ of the top surface of the bottom wall of the body $1^a$.

The outer surface of the mass $21^a$ fixed in the body $1^a$ and the inner surface of the mass $14^a$ fixed around the mandrel nose portion $2^a$ are cylindrical and their diameters are such that they define therebetween and the body $1^a$ or the nose portion $2^a$ annular chambers $16^a$ and $23^1$ having a section which is constant axially of the die head. The chamber $16^a$ is defined at its downstream end by the end wall 45 of the body and the chamber $23^1$ is defined at its downstream end by a flange 49 on the mandrel nose portion $2^a$. The chamber $16^a$ is supplied with gas by way of a radial passage $33^a$ extending through the wall 44 adjacent the upstream end of the chamber $16^a$ and the chamber $23^a$ is supplied with gas by way of an axial passage $32^a$ extending through the mandrel 48.

The annular space $24^a$ for the flow of the plastics material has a general shape which is convergent in the downstream direction and its inclination at the upstream end of the die head is such that it is tangentially connected to the annular space 50 for the flow of the plastics material which separates the body 47 from the mandrel 48 in the extruder. At its downstream end the space $24^a$ communicates with the interior of the opening 46 of the die head body which is made larger for this purpose.

In axial section, the space $24^a$ has a substantially hyperbolic shape and its cross section decreases progressively in the direction from the upstream end to the downstream end. The curves which define the axial section may have equations of the type:

$$y = \frac{a}{\sqrt{x}}$$

in which $a$ is smaller for the inner profile than for the outer profile.

The die head just described operates in a similar manner to the die head shown in FIG. 1 owing to the formation and maintenance of similar gas cushions $40^a$ and $41^a$, the profile of the space $24^a$ being here adapted for a constant pressure gradient throughout the axial extent of the die head.

As concerns this second embodiment of the die head, the same remarks may be made as for the first embodiment as to the advantages afforded, the necessary conditions of utilisation and the possible modifications.

The invention is applicable not only to thermoplastic materials but also to like extrudable materials, such as for example rubber, alimentary pastes, ceramic pastes, asbestos-cement pastes.

Having now described our invention what we claim as new and desire to secure by Letters Patent is:

1. A die head for an extruder, the die head comprising means defining a body having an inlet and an outlet for the extruded material, means defining an axial mandrel inside said body for the extrusion of a hollow product, wall means comprising an inner portion which is carried by the mandrel an an outer portion carried by the die head body, said inner portion of said wall means having an outer surface and having a section which decreases in a direction from said inlet to said outlet and said outer portion of said wall means having an inner surface, said inner surface and outer surface defining an annular passage for the flow under pressure of the material being extruded, at least a part of said inner portion and at least a part of said outer portion being of a material pervious to gaseous fluid and defining at least a part of said outer and inner surfaces, the annular flow passage having a section which decreases progressively in the direction from the inlet to the outlet of the die head in at least a portion of said parts pervious to said gaseous fluid, means defining a plurality of separate first chambers surrounding said part of said outer portion which is of pervious material and respectively communicating with different portions of said part of pervious material, each of said chambers having a separate inlet for communication with a source of gaseous fluid, means defining a plurality of separate second chambers respectively surrounded by different portions of said part of said inner portion which is of pervious material, said second chambers respectively communicating with said different portions of said part of said inner portion and each of said second chambers having a separate inlet for communication with a source of gaseous fluid.

* * * * *